United States Patent
Li et al.

(10) Patent No.: US 8,804,549 B2
(45) Date of Patent: Aug. 12, 2014

(54) METHOD AND APPARATUS FOR TRANSMITTING DEDICATED REFERENCE SIGNAL

(75) Inventors: Yingyang Li, Beijing (CN); Xiaoqiang Li, Beijing (CN)

(73) Assignee: Samsung Electronics Co., Ltd (KR)

( * ) Notice: Subject to any disclaimer, the term of this patent is extended or adjusted under 35 U.S.C. 154(b) by 570 days.

(21) Appl. No.: 12/917,957

(22) Filed: Nov. 2, 2010

(65) Prior Publication Data
US 2011/0103250 A1 May 5, 2011

(30) Foreign Application Priority Data
Nov. 2, 2009 (CN) .......................... 2009 1 0207934

(51) Int. Cl.
*H04W 72/04* (2009.01)
*H04L 12/26* (2006.01)

(52) U.S. Cl.
USPC ............................ 370/252; 370/328; 370/329

(58) Field of Classification Search
CPC ........................... H04W 76/046; H04B 7/0452
USPC ................. 370/208, 252, 329, 342, 343, 350; 375/260; 455/422.1, 509
See application file for complete search history.

(56) References Cited

U.S. PATENT DOCUMENTS

| 8,300,587 | B2 * | 10/2012 | Chmiel et al. | 370/329 |
|---|---|---|---|---|
| 2005/0047482 | A1 * | 3/2005 | Gossett et al. | 375/146 |
| 2007/0293172 | A1 | 12/2007 | Shi et al. | |
| 2008/0232494 | A1 | 9/2008 | Pan et al. | |
| 2009/0060004 | A1 * | 3/2009 | Papasakellariou et al. | 375/140 |
| 2009/0318183 | A1 * | 12/2009 | Hugl et al. | 455/522 |
| 2010/0061345 | A1 * | 3/2010 | Wengerter et al. | 370/335 |
| 2010/0172235 | A1 * | 7/2010 | Liu et al. | 370/208 |
| 2010/0246527 | A1 * | 9/2010 | Montojo et al. | 370/330 |
| 2011/0038344 | A1 * | 2/2011 | Chmiel et al. | 370/330 |
| 2011/0077038 | A1 * | 3/2011 | Montojo et al. | 455/507 |
| 2011/0085503 | A1 * | 4/2011 | Nam et al. | 370/329 |

(Continued)

OTHER PUBLICATIONS

Nagata et al., "Investigation on Transmit Diversity for Synchronization Channel in OFDM Based Evolved UTRA Downlink", 2008, IEEE, 978-1-4244-1722-3/08, p. 1-6.*

(Continued)

*Primary Examiner* — Hassan Kizou
*Assistant Examiner* — Amy Ling
(74) *Attorney, Agent, or Firm* — The Farrell Law Firm, P.C.

(57) ABSTRACT

A method and apparatus for transmitting a dedicated reference signal (DRS) are provided, the method including determining, by a base station, whether user equipments (UEs) participating in multiple users-multiple input multiple output (MU-MIMO) at the same physical resource block (PRB) belong to the same cell, if yes, configuring that the UEs adopt a cell-specific scrambling code sequence; otherwise, configuring that the UEs located in the cells belonging to the same cell group adopt a cell group-specific scrambling code sequence; sending, by the base station, configuration information to the UE, and sending a DRS to the UE by using the scrambling code sequence configured for the UE; an initialization code of the cell-specific scrambling code sequence is determined according to an identity of the cell in which the UE is located; an initialization code of the cell group-specific scrambling code sequence is determined according to an identity of the cell group. As such, the UE can restrain DRS interferences between different cells when receiving the DRS and improve the precision of the channel estimation.

15 Claims, 7 Drawing Sheets

(56) References Cited

U.S. PATENT DOCUMENTS

| | | | |
|---|---|---|---|
| 2011/0103324 A1* | 5/2011 | Nam et al. | 370/329 |
| 2011/0194501 A1* | 8/2011 | Chung et al. | 370/328 |
| 2011/0299625 A1* | 12/2011 | Hooli et al. | 375/295 |
| 2012/0033571 A1* | 2/2012 | Shimezawa et al. | 370/252 |
| 2012/0033630 A1* | 2/2012 | Chung et al. | 370/329 |
| 2012/0057558 A1* | 3/2012 | Prasad et al. | 370/329 |
| 2012/0106472 A1* | 5/2012 | Rosa et al. | 370/329 |
| 2013/0279466 A9* | 10/2013 | Lee et al. | 370/330 |

OTHER PUBLICATIONS

Li et al., "Advancement of MIMO Technology in WiMAX: From IEEE 802.16d/e/j to 802.16m", IEEE Communications Magazine, vol. 47, pp. 100-107, Jun. 2009.

* cited by examiner

FIG. 1

(PRIOR ART)

FIG. 2

(PRIOR ART)

METHOD AND APPARATUS FOR TRANSMITTING DEDICATED REFERENCE SIGNAL

PRIORITY

This application claims priority under 35 U.S.C. §119(a) to a Chinese Patent Application No. 200910207934.1, filed in the Chinese Intellectual Property Office on Nov. 2, 2009, the entire disclosure of which is hereby incorporated by reference.

BACKGROUND

1. Field of the Invention

The present invention related to mobile communication technologies, and more particularly, to a method and apparatus for transmitting a dedicated reference signal.

2. Description of the Related Art

In a Long Term Evolution-Advanced (LTE-A) system, in order to support a higher peak speed, each cell may configure multiple transmitting antennae, e.g. 8 transmitting antennae; at the same time, in order to reduce overhead of pilot signals, a user equipment (UE) demodulates downlink data by using a dedicated reference signal (DRS) sent by a base station. When sending the DRS, the base station respectively sends the DRS for each path of the data, i.e. each data stream; after receiving the DRS, the UE demodulates each path of the data.

Figure 1:
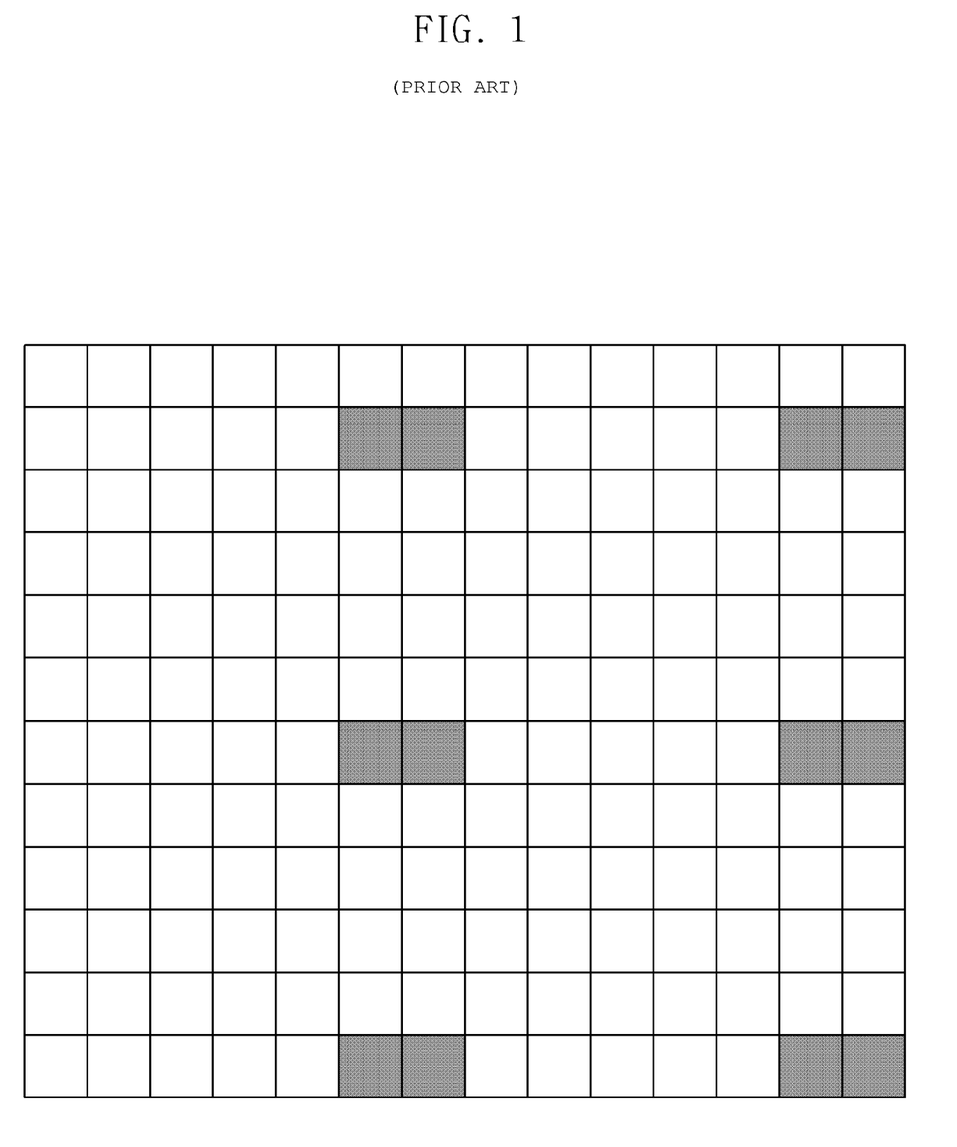
FIG. 1 is a schematic diagram illustrating a DRS structure currently used in a LTE-A system.

In the LTE-A system, data of multiple UEs may be transmitted in the same time-frequency resources by using a multiple users-multiple input multiple output (MU-MIMO) technology; for the MU-MIMO based on the DRS, the base station configures that multiple UEs of the MU-MIMO adopt different DRS patterns, and preferably, the DRS patterns are orthogonal, so that the UEs can obtain better channel estimation performances. FIG. 1 is a schematic diagram illustrating a DRS structure currently adopted by an enhanced downlink transmission technology in a LTE-A version 9. As shown in FIG. 1, in a physical resource block (PRB), on a resource element (RE) adopted for the DRS, multiplexing is performed for two paths of orthogonal DRSs by using a code division multiplexing (CDM) mode, i.e. the length of extended codes of the DRS is 2. Herein, the RE adopted for the DRS is called as a DRS RE, gray blocks shown in FIG. 1 are resources adopted for the DRS.

Figure 2:
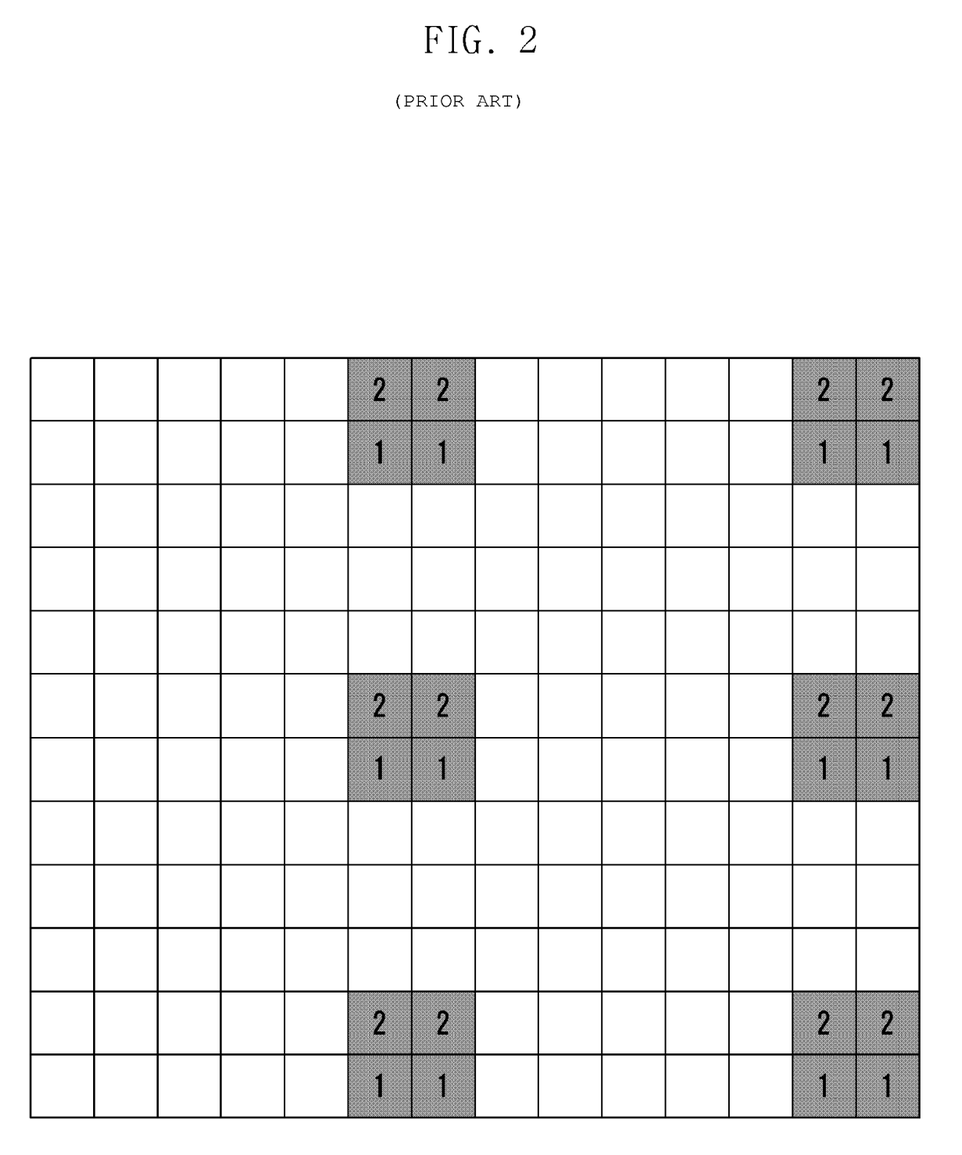
FIG. 2 is a schematic diagram illustrating another DRS structure currently used in a LTE-A system.

In order to support more amount of data stream, the DRS REs may be divided into two groups by using a frequency division multiplexing (FDM) mode. As shown in FIG. 2, the DRS REs with the number 1 is the first DRS RE group, and the DRS REs with the number 2 is the second DRS RE group; each DRS RE group adopts the CDM mode so as to support multiplexing of at best four paths of orthogonal DRSs.

Figure 3:
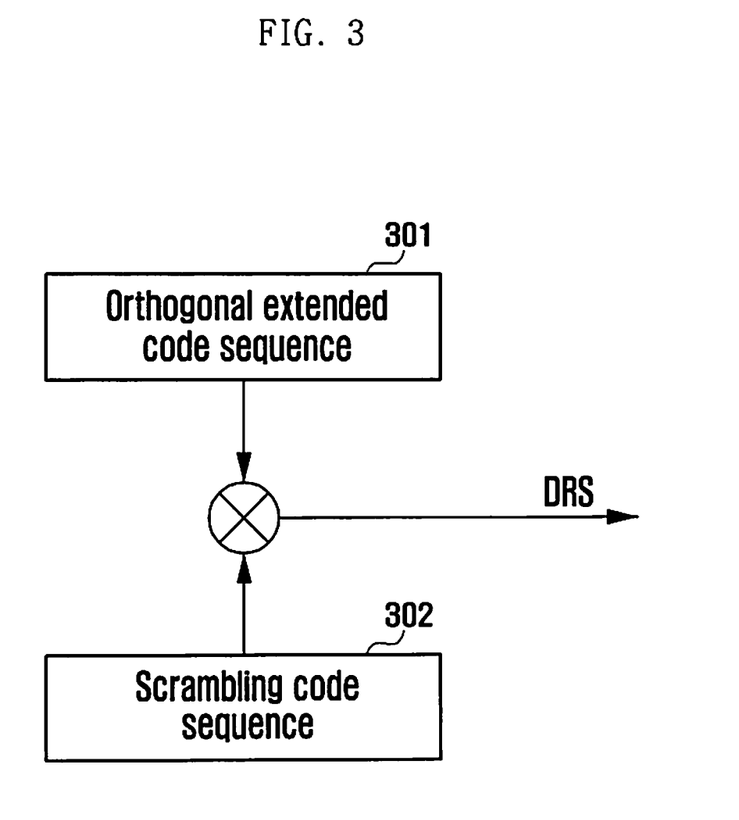
FIG. 3 is a schematic diagram illustrating signal generation of a DRS.

The DRS is obtained by multiplying one part of signals by the other part of signals; as shown in FIG. 3, one part of the signals is an orthogonal extended code sequence 301, represented as w(n), the other part of the signals is a scrambling code sequence 302, represented as r(n), thus the DRS may be represented as DRS(n)=w(n)·r(n), herein n is an index of the DRS RE.

In the enhanced downlink transmission of the LTE-A version 9, a method for generating the scrambling code sequence r(n) is $$r(n) = \frac{1}{\sqrt{2}}(1 - 2 \cdot c(2n)) + j\frac{1}{\sqrt{2}}(1 - 2 \cdot c(2n+1)),$$

$n=0, 1, \ldots, 12N_{RB}^{max,DL}-1$, $N_{RB}^{max, DL}$ is the maximum of the downlink resource blocks; the pseudo-random sequence c(i) is initialized over again at the beginning of each subframe, specifically a initialized value is $c_{init}=(\lfloor n_s/2 \rfloor+1) \cdot (2N_{ID}^{cell}+1) \cdot 2^{16}+n_{SCID}$, herein $n_{SCID} \in \{0,1\}$ is dynamically configured through a physical downlink control channel (PDCCH) or configured as 0, $N_{ID}^{cell}$ is an identity of a cell. As can be seen, the $c_{init}$ does not relate to the identity of the dispatched UE, but relates to the identity of the cell to which the dispatched UE belongs, that is, the scrambling code sequence r(n) is a cell-specific sequence, i.e. all the UEs in the same cell use the same scrambling code sequence. When dispatching not more than two UEs, the base station may obtain the orthogonal DRSs by distributing a scrambling code sequence corresponding to the same $n_{SCID}$ and different extended codes, so as to optimize the channel estimation performance. When the base station needs to pellucidly dispatch more than two UEs, an additional DRS is generated by using a cell-specific scrambling code sequence r'(n) corresponding to another $n_{SCID}$, r'(n) and r(n) are independent random sequences.

Since the scrambling code sequence is the cell-specific sequence, single-cell MU-MIMO is effectively supported, but when multiple-cell MU-MIMO, i.e. a Coordinated Multipoint (COMP) transmission technology needs to be supported, the UEs of different cells respectively adopt cell-specific scrambling code sequences, and thus the scrambling code sequences adopted by the UEs of different cells are different, and the UE can not obtain the scrambling code sequences adopted by the UEs of other cells. In this way, the UE can not know whether other cell sends the DRS at the same PRB, and thus the UE can not restrain DRS interferences between different cells.

SUMMARY

The present invention provide a method and base station for transmitting a DRS, so that a UE can restrain DRS interferences between different cells when receiving the DRS, and precision of channel estimation is improved.

A method for transmitting a DRS includes:

determining, by a base station, whether user equipments (UEs) participating in multiple users-multiple input multiple output (MU-MIMO) at the same physical resource block (PRB) belong to the same cell, if yes, configuring that the UEs adopt a cell-specific scrambling code sequence; otherwise, configuring that the UEs located in the cells belonging to the same cell group adopt a cell group-specific scrambling code sequence;

sending, by the base station, configuration information to the UE, and sending a DRS to the UE by using the scrambling code sequence configured for the UE;

wherein an initialization code of the cell-specific scrambling code sequence is determined according to an identity of the cell in which the UE is located; an initialization code of the cell group-specific scrambling code sequence is determined according to an identity of the cell group.

A base station for transmitting a DRS includes: a type determining unit, a type configuring unit and a sending processing unit; wherein the type determining unit is adapted to determine whether UEs participating in MU-MIMO at the same PRB belong to the same cell;

the type configuring unit is adapted to configure that the UEs adopt a cell-specific scrambling code sequence when a determining result of the type determining unit is yes; configure that the UEs located in the cells belonging to the same cell group adopt a cell group-specific scrambling code sequence when the determining result of the type determining unit is no;

the sending processing unit is adapted to send configuration information of the type configuring unit to the UE, and send a DRS to the UE by using the scrambling code sequence configured for the UE;

wherein an initialization code of the cell-specific scrambling code sequence is determined according to an identity of the cell in which the UE is located; an initialization code of the cell group-specific scrambling code sequence is determined according to an identity of the cell group.

As can be seen from the above technical scheme, in the present invention, for the UE adopting the single-cell MU-MIMO, the base station configures that the UE adopts the cell-specific scrambling code sequence, and the initialization code of the cell-specific scrambling code sequence is determined according to the identity of the cell. For the UE adopting the multiple-cell MU-MIMO, the base station configures that the UE adopts the cell group-specific scrambling code sequence, and the initialization code of the cell group-specific scrambling code sequence is determined according to the identity of the cell group, so that the UE can obtain the scrambling code sequences of other cells which belong to the same cell group, thereby effectively restraining the DRS interferences and improving the precision of the channel estimation.

DETAILED DESCRIPTION OF THE INVENTION

In order to make objects, technical solutions and merits of the present invention more clear, the present invention will be illustrated in detail hereinafter with reference to the accompanying drawings and specific embodiment.

The core idea of a method provided by the present invention includes that: a base station supports two types of scrambling code sequences of a DRS at the same time, i.e. a cell-specific scrambling code sequence and a cell group-specific scrambling code sequence, and the base station can perform control and determine to adopt one of the two scrambling code sequences or to adopt the two scrambling code sequences at the same time.

Figure 4:
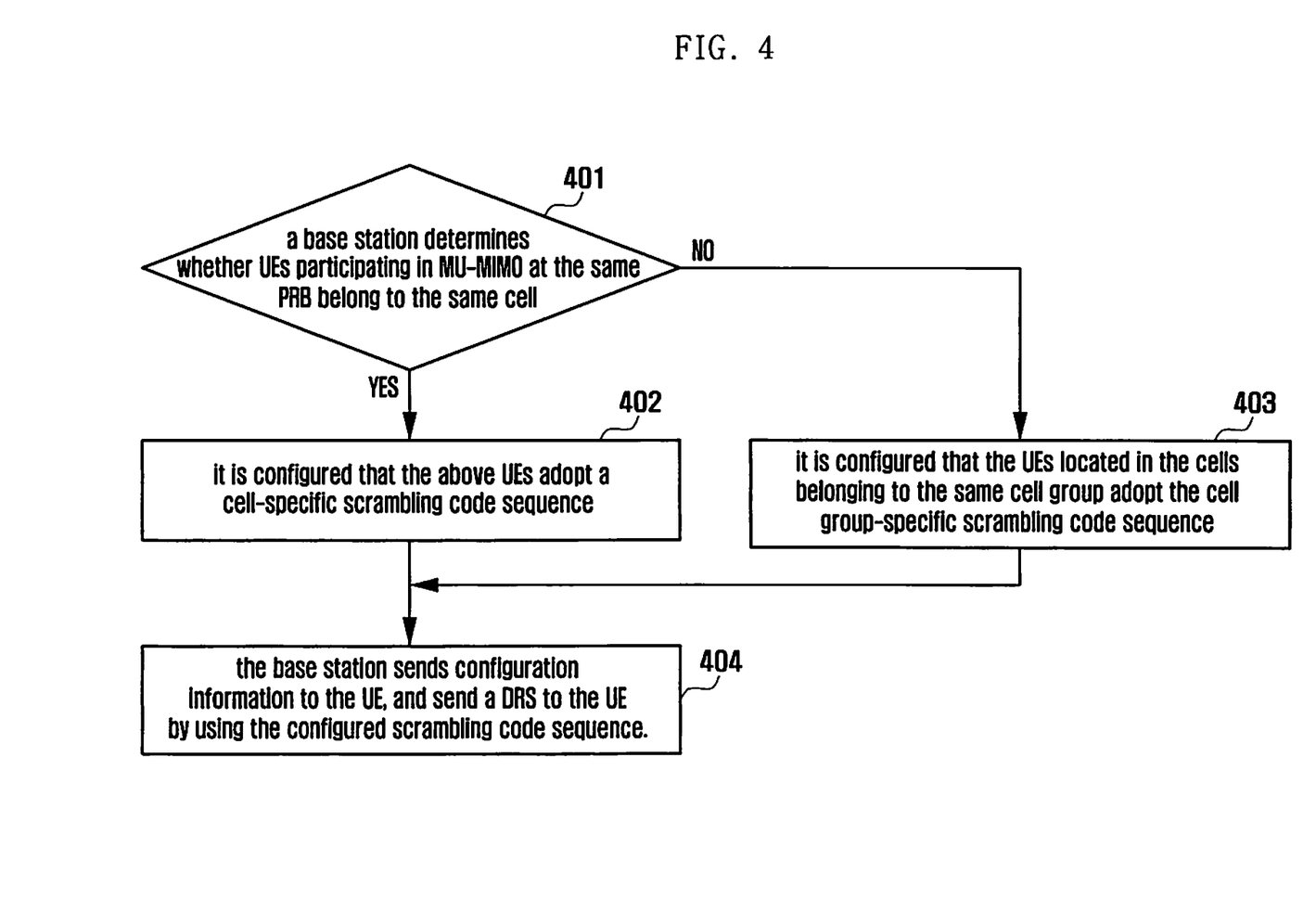
FIG. 4 is a flowchart illustrating a main method in accordance with an embodiment of the present invention.

FIG. 4 shows a method provided by the present invention. The method mainly includes the following steps.

Step 401: a base station determines whether UEs participating in MU-MIMO at the same PRB belong to the same cell, if yes, step 402 is performed; otherwise, step 403 is performed.

At a current dispatching time point, the base station may firstly determine which UEs at the same PRB can be dispatched to participate in the MU-MIMO, this determining operation can adopt conventional modes and is not described herein. Then, the base station determines whether the UEs belong to the same cell or different cells, that is, determine whether to adopt the single-cell MU-MIMO or the multiple-cell MU-MIMO. Of course, the two types of the MU-MIMO technologies may be used mixedly.

Step 402: it is configured that the above UEs adopt a cell-specific scrambling code sequence, and step 404 is performed.

When determining that the UEs participating in the MU-MIMO at the same PRB belong to the same cell, the base station determines to adopt the single-cell MU-MIMO technology, and preferentially configures that the UEs adopt the cell-specific scrambling code sequence. An initialization code of the cell-specific scrambling code sequence is determined according to an identity of the cell to which the UE belongs.

Specifically, when the number of the UEs participating in the single-cell MU-MIMO dispatching is larger than the maximum of the DRSs supported by the cell-specific scrambling code sequence, it may be configured that a part of the UEs, the number of which is not more than the maximum of the DRSs supported by the cell-specific scrambling code sequence, adopt the cell-specific scrambling code sequence, while the other UEs adopt a cell group-specific scrambling code sequence.

Step 403: it is configured that the UEs located in the cells belonging to the same cell group adopt the cell group-specific scrambling code sequence.

When determining that the UEs participating in the MU-MIMO at the same PRB belong to different cells, the base station determines to adopt the multiple-cell MU-MIMO technology, and preferentially configures that the UEs adopt the cell group-specific scrambling code sequence. An initialization code of the cell group-specific scrambling code sequence is determined according to an identity of the cell group.

Specifically, when the number of the UEs participating in the multiple-cell MU-MIMO dispatching is larger than the maximum of the DRSs supported by the cell group-specific scrambling code sequence, it may be configured that a part of the UEs, the number of which is not more than the maximum of the DRSs supported by the cell group-specific scrambling code sequence, adopt the cell group-specific scrambling code sequence, while the other UEs adopt the cell-specific scrambling code sequence.

When dividing the cells into the cell groups, multiple adjacent cells, e.g. several adjacent cells performing CoMP transmission, may be divided into one cell group. In this way, when the multiple-cell MU-MIMO is performed, the UE in one cell of the cell group can know the DRS sequences of the UEs in other cells of the cell group, thereby effectively restraining interferences of other UEs and improving receiving performances. One cell may belong to one cell group or belong to multiple cell groups.

The identity of the cell group to which the cell belongs may be sent to the UE through a broadcast channel or radio resource control (RRC) signaling, so that the UE can obtain the identity of the cell group to which the cell in which the UE is located belongs from the broadcast channel or the RRC signaling.

Step 404: the base station sends configuration information to the UE, and send a DRS to the UE by using the configured scrambling code sequence.

The configuration information in this step may include information of the scrambling code sequence adopted for the UE which may include the type of the scrambling code sequence adopted for the UE or a parameter of the scrambling code sequence adopted for the UE. Beside the above configuration information, the base station may further send the UE information of the DRS RE group distributed to the UE, which will be described in the following embodiments.

The above method is described in detail based on several embodiments.

The first embodiment, the cell-specific scrambling code sequence and the cell group-specific scrambling code sequence are both supported at each DRS RE group.

Figure 5:
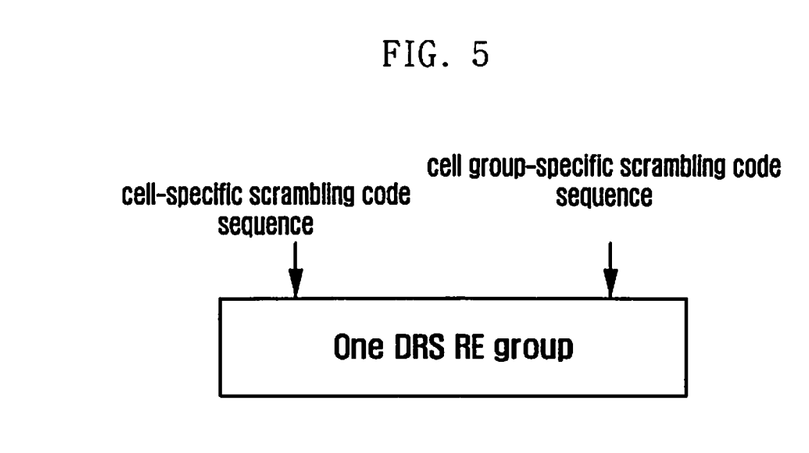
FIG. 5 is a schematic diagram 1 illustrating a scrambling code sequence supported by a DRS RE group in accordance with a first embodiment of the present invention.

If all the DRS REs belong to the same group, as shown in FIG. 5, this DRS group supports two types of scrambling code sequences at the same time. The initialization code of the cell-specific scrambling code sequence may be generated according to the identity of the cell $N_{ID}^{cell}$ and a number of a time slot in which the current PRB is located $n_s$, for example according to $c_{init}=(\lfloor n_s/2 \rfloor+1)\cdot(2N_{ID}^{cell}+1)\cdot 2^{16}$; the initialization code of the cell group-specific scrambling code sequence may be generated according to the identity of the cell group $N_{ID}^{group}$ and the number of the time slot $n_s$, for example according to $c_{init}=(\lfloor n_s/2 \rfloor+1)\cdot(2N_{ID}^{group}+1)\cdot 2^{16}+N_{ID}^{group}$.

Figure 6:
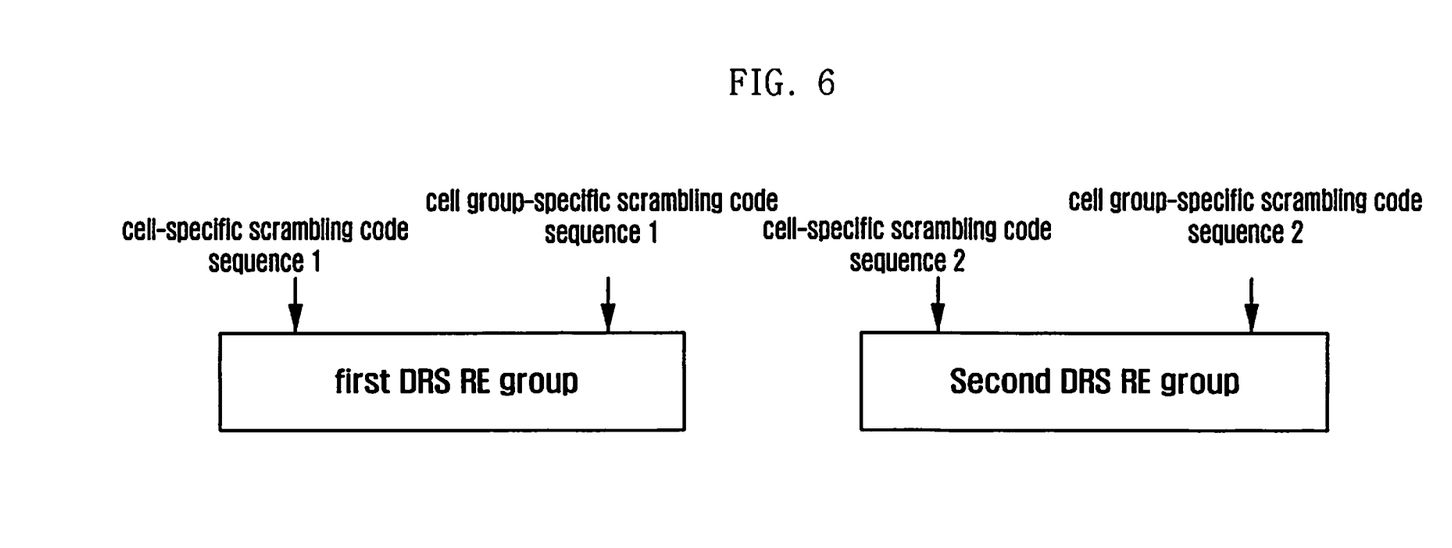
FIG. 6 is a schematic diagram 2 illustrating a scrambling code sequence supported by a DRS RE group in accordance with a first embodiment of the present invention.

If the DRS REs are divided into multiple groups, as shown in FIG. 6, it is supported that the DRS REs are divided into two groups, and the two DRS groups support two types of the scrambling code sequences at the same time. The cell-specific scrambling code sequences supported by the two DRS RE groups may be the same or different; the cell group-specific scrambling code sequences supported by the two DRS RE groups may be the same or different; in FIG. 6, it is supported that the cell-specific scrambling code sequences supported by the two DRS RE groups are different, and the cell group-specific scrambling code sequences supported by the two DRS RE groups are different. In this way, another parameter, i.e. an index of the DRS RE group, may be added when the initialization code of the cell-specific scrambling code sequence and the initialization code of the cell group-specific scrambling code sequence are generated. The index of the DRS RE group is represented as g, thus the initialization code of the cell-specific scrambling code sequence may be generated according to the identity of the cell $N_{ID}^{cell}$, the number of the time slot $n_s$ and and the index of the DRS RE group g, for example according to $c_{init}=(\lfloor n_s/2 \rfloor+1)\cdot(2N_{ID}^{cell}+1)\cdot 2^{16}+g$; the initialization code of the cell group-specific scrambling code sequence may be generated according to the identity of the cell group $N_{ID}^{group}$, the number of the time slot $n_s$ and and the index of the DRS RE group g, for example according to $c_{init}=(\lfloor n_s/2 \rfloor+1)\cdot(2N_{ID}^{group}+1)\cdot 2^{16}+g\cdot 2^9+N_{ID}^{group}$, it is supposed that the bit number of the $N_{ID}^{group}$ is 9, or according to $c_{init}=(\lfloor n_s/2 \rfloor+1)\cdot(2N_{ID}^{group}+1)\cdot 2^{16}+2\cdot N_{ID}^{group}+g$, it is supposed that the bit number of the $N_{ID}^{group}$ is 2.

It should be noted that, the functions for generating the initialization code are not limited in the present invention, only the parameters used for generating the initialization code are limited, for example the identity of the cell $N_{ID}^{cell}$, the identity of the cell group $N_{ID}^{group}$, the number of the time slot $n_s$ or or the index of the DRS RE group, which are also applicable for the following embodiments.

For the case shown in FIG. 6, any one of the DRS RE groups may be distributed to the UE adopting the single-cell MU-MIMO and the UE adopting the multiple-cell MU-MIMO, and the UE is informed of information of the DRS RE group distributed to the UE and type information of the scrambling code sequence. Specifically, the information of the DRS RE group distributed to the UE may be carried by DRS port indication information in the PDCCH, and sent by the base station to the UE. In addition, the type information of the scrambling code sequence adopted for the UE, i.e. the type information of the scrambling code sequence adopted for the UE in the DRS RE group distributed to the UE, may be carried by extended bits in the PDCCH, for example, one extended bit may be adopted to indicate whether the cell-specific scrambling code sequence or the cell group-specific scrambling code sequence is configured for the UE.

In the case of this embodiment, the DRS RE group may be distributed to the UE by using a default mode, i.e. a fixedly DRS RE group is distributed to the UE according to a preset mode, for example, impliedly, the DRSs are transmitted through two DRS REs for all the UEs.

The second embodiment, each DRS RE group supports one of the cell-specific scrambling code sequence and the cell group-specific scrambling code sequence, and one type of the scrambling code sequences is configured for one part of the DRS RE group, and the other type of the scrambling code sequences is configured for the other part of the DRS RE group.

Figure 7:
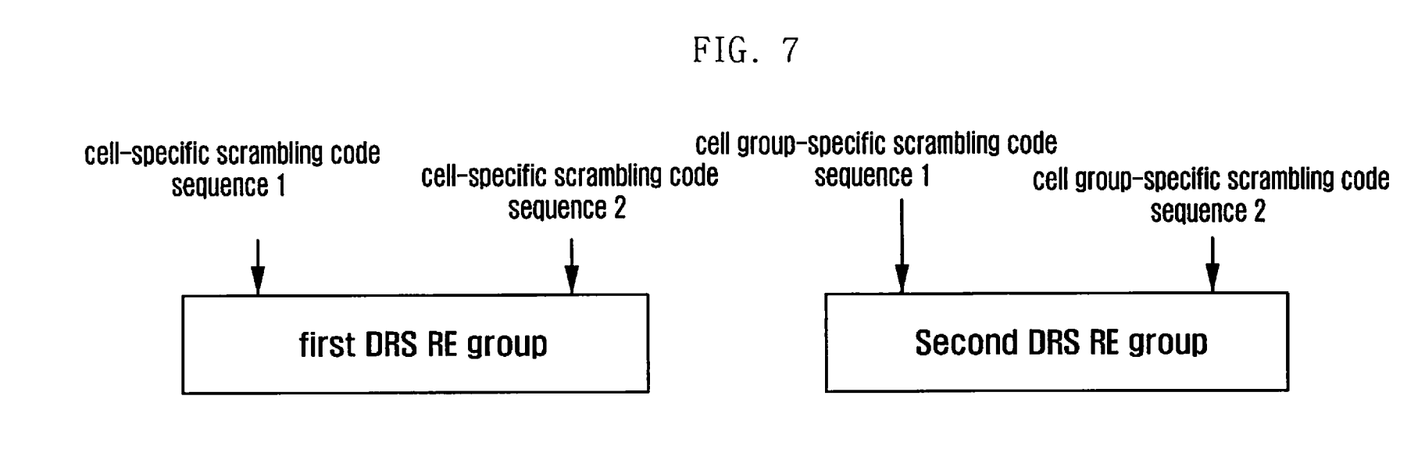
FIG. 7 is a schematic diagram illustrating a scrambling code sequence supported by a DRS RE group in accordance with a second embodiment of the present invention.

It is supported that there are two DRS RE groups, and one DRS RE group is configured to support the cell-specific scrambling code sequence, and the other DRS RE group is configured to support the cell group-specific scrambling code sequence. As shown in FIG. 7, the cell-specific scrambling code sequence is configured on the first DRS RE group, the initialization code of the cell-specific scrambling code sequence may be generated according to the identity of the cell $N_{ID}^{cell}$, the number of the time slot $n_s$ and a sequence number $n_{SCID}$, for example according to $c_{init}=(\lfloor n_s/2 \rfloor+1)\cdot(2N_{ID}^{cell}+1)\cdot 2^{16}+n_{SCID}$.

The cell group-specific scrambling code sequence is configured on the second DRS RE group, the initialization code of the cell group-specific scrambling code sequence may be generated according to the identity of the cell group $N_{ID}^{group}$, the number of the time slot $n_s$ and the sequence number $n_{SCID}$, for example according to $c_{init}=(\lfloor n_s/2 \rfloor+1)\cdot(2N_{ID}^{group}+1)\cdot 2^{16}+n_{SCID}$.

In the first DRS RE group, if there are not more than two UEs which are in the same cell and participate in the MU-MIMO, orthogonal DRSs may be obtained by distributing the cell-specific scrambling code sequence corresponding to the same $n_{SCID}$ and the different extended codes to the UEs; if there are more than two UEs which are in the same cell and participate in the MU-MIMO, the cell-specific scrambling code sequence corresponding to the other $n_{SCID}$ may be adopted, so that different UEs correspond to different DRSs. Similarly, in the second DRS RE group, if there are not more than two UEs which are in the same cell and participate in the MU-MIMO, orthogonal DRSs may be obtained by distributing the cell group-specific scrambling code sequence corresponding to the same $n_{SCID}$ and different extended codes to the UEs; if there are more than two UEs which are in the same cell and participate in the MU-MIMO, the cell group-specific scrambling code sequence corresponding to the other $n_{SCID}$ may be adopted, so that different UEs correspond to different DRSs.

For the case shown in FIG. 7, the base station may configure that the UE adopting the single-cell MU-MIMO uses the first DRS RE group; when the number of the UEs adopting the single-cell MU-MIMO multiplexing is more than the number of the DRSs can be provided by the cell-specific scrambling code sequence, the base station may configure that a part of the UEs uses the second DRS RE group; the base station may configure that the UE adopting the multiple-cell MU-MIMO uses the second DRS RE group; when the number of the UEs adopting the multiple-cell MU-MIMO multiplexing is more than the number of the DRSs can be provided by the cell group-specific scrambling code sequence, the base station may configure that a part of the UEs uses the first DRS RE group.

In addition, the base station will inform the UE of the information of the DRS RE group distributed to the UE and the type information of the scrambling code sequence. Specifically, the information of the DRS RE group distributed to the UE may be carried by DRS port indication information in the PDCCH, and sent to the UE by the base station; the parameter adopted by the scrambling code sequence of UE may be carried by extended bits in the PDCCH; since one DRS RE group adopts a certain type of scrambling code sequence in this embodiment, when obtaining the distributed DRS RE group, the UE can obtain the type of the scrambling code sequence adopted by the DRS RE group, so that only one extended bit in the PDCCH may be adopted to carry the $n_{SCID}$ of the scrambling code sequence adopted for the UE.

The third embodiment, one type of the scrambling code sequences is configured for one part of the DRS RE groups, and two types of the scrambling code sequences are configured for the other part of the DRS RE groups.

Figure 8:
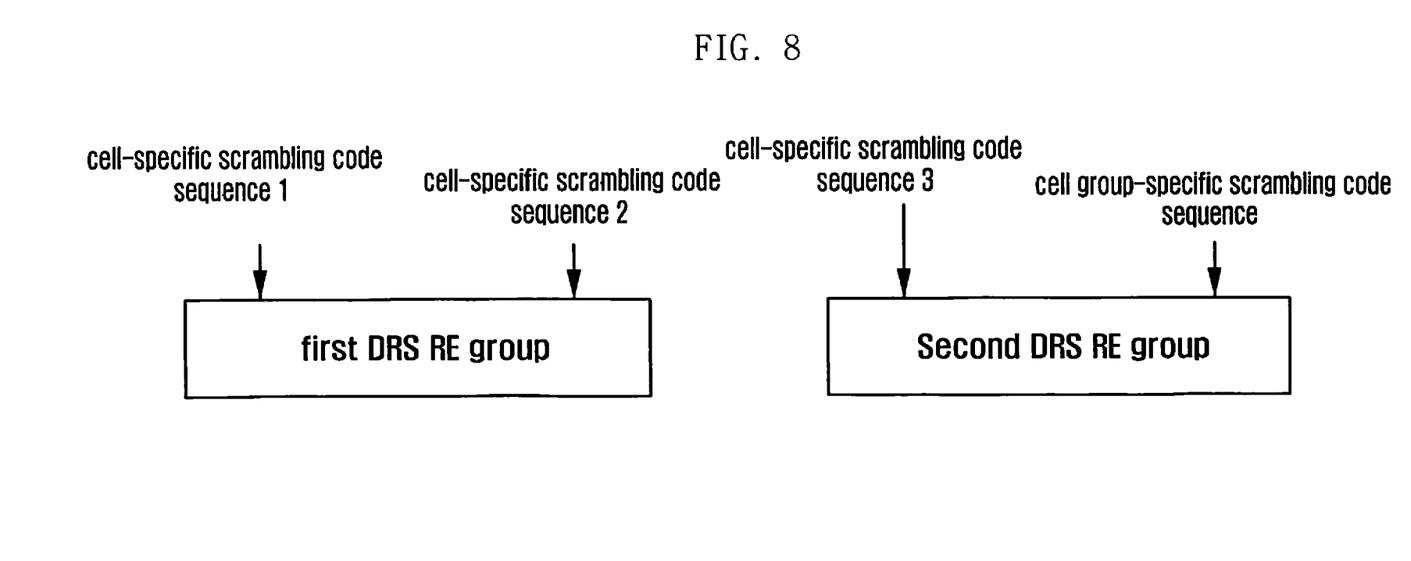
FIG. 8 is a schematic diagram illustrating a scrambling code sequence supported by a DRS RE group in accordance with a third embodiment of the present invention.

It is still supported that there are two DRS RE groups, as shown in FIG. 8, the cell-specific scrambling code sequence may be configured for the first DRS RE group, and the cell group-specific scrambling code sequence and the cell-specific scrambling code sequence are configured for the second DRS RE group.

In the embodiment, for the DRS RE group for which two cell-give scrambling code sequences are configured, the initialization code of the cell-specific scrambling code sequence may be generated according to the identity of the cell $N_{ID}^{cell}$, the number of the time slot $n_s$ and the sequence number $n_{SCID}$, for example according to $c_{init}=(\lfloor n_s/2 \rfloor+1)\cdot(2N_{ID}^{cell}+1)\cdot 2^{16}+n_{SCID}$, herein $n_{SCID} \in \{0,1\}$, which can support multiple UEs in the same cell; if only one cell-specific scrambling code sequence is configured for the DRS RE group, the initialization code of the cell-specific scrambling code sequence may be generated according to only the identity of the cell $N_{ID}^{cell}$ and the number of the time slot $n_s$, for example according to $c_{init}=(\lfloor n_s/2 \rfloor+1)\cdot(2N_{ID}^{cell}+1)\cdot 2^{16}$. The initialization code of the cell group-specific scrambling code sequence may be generated according to the identity of the cell group $N_{ID}^{group}$ and the number of the time slot $n_s$, for example according to $c_{init}=(\lfloor n_s/2 \rfloor+1)\cdot(2N_{ID}^{group}+1)\cdot 2^{16}+N_{ID}^{group} n_{SCID}$.

For the case shown in FIG. 8, the base station may configure that the UE adopting the single-cell MU-MIMO uses the first DRS RE group or the second DRS RE group; the base station may configure that the UE adopting the multiple-cell MU-MIMO uses the second DRS RE group. The base station will inform the UE of the information of the DRS RE group distributed to the UE and the type information of the scrambling code sequence. Specifically, the information of the DRS RE group distributed to the UE may be carried by DRS port indication information in the PDCCH, and sent to the UE by the base station; the type of the scrambling code sequence or the parameter adopted by the UE may be carried by extended bits in the PDCCH, for example, if the first DRS RE group in FIG. 8 is distributed to the UE, since the first DRS RE group only adopts a certain type of scrambling code sequence, when obtaining that the first DRS RE group is distributed, the UE can obtain that the cell-specific scrambling code sequence is adopted, so that one extended bit in the PDCCH may be adopted to carry the $n_{SCID}$ of the scrambling code sequence adopted for the UE; if the second DRS RE group in FIG. 8 is distributed to the UE, one extended bit in the PDCCH may be adopted to carry the type information of the scrambling code sequence adopted for the UE.

In the above embodiments, the cell uniquely belongs to a certain cell group with the identity of $N_{ID}^{group}$, in order to better restrain the DRS interferences, it may be configured that different cells belong to different cell groups, and multiple identities of the cell groups are distributed accordingly. In this case, two following two modes may be adopted.

In the first mode, the identity of the cell group is respectively configured for each DRS RE group, i.e. it is configured that each DRS RE group fixedly corresponds to a cell group different from other cell groups; the identity of the cell group corresponding to the DRS RE group with an index g is represented as $N_{ID,g}^{group}$, the initialization code of the cell group-specific scrambling code sequence may be generated according to the identity of the cell group $N_{ID}^{group}$, the number of the time slot $n_s$, for example, according to $c_{init}=(\lfloor n_s/2 \rfloor+1)\cdot(2N_{ID}^{group}+1)\cdot 2^{16}+N_{ID,g}^{group}$; or the initialization code of the cell group-specific scrambling code sequence may be generated according to the identity of the cell group $N_{ID}^{group}$, the number of the time slot $n_s$, and the sequence number $n_{SCID}$, for example, according to $c_{init}=(\lfloor n_s/2 \rfloor+1)\cdot(2N_{ID}^{group}+1)\cdot 2^{16}+2N_{ID,g}^{group}+n_{SCID}$.

In the second mode, the identity of the cell group is configured for each cell group-specific scrambling code sequence of each DRS RE group, i.e. it is configured that each cell group-specific scrambling code sequence of each DRS RE group fixedly corresponds to a cell group different from other cell groups, the identity of the cell group corresponding to the cell group-specific scrambling code sequence represented as k is represented as $N_{ID,k}^{group}$, the initialization code of the cell group-specific scrambling code sequence may be generated according to the identity of the cell group $N_{ID,k}^{group}$ and the number of the time slot $n_s$, for example according $c_{init}=(\lfloor n_s/2 \rfloor+1)\cdot(2N_{ID}^{group}+1)\cdot 2^{16}+N_{ID,k}^{group}$.

Preferably, the cell group to which the cell belongs may change periodically, and in different periods, different cell groups are respectively adopted for the cell; for example, the period is N sub-frames, a certain cell respectively belongs to different cell groups in each N sub-frames, i.e. corresponds to different identities of the cell groups. N is predefined or a parameter configured by a high layer, for example, N is equal to the number of sub-frames in one frame, 10.

Figure 9:
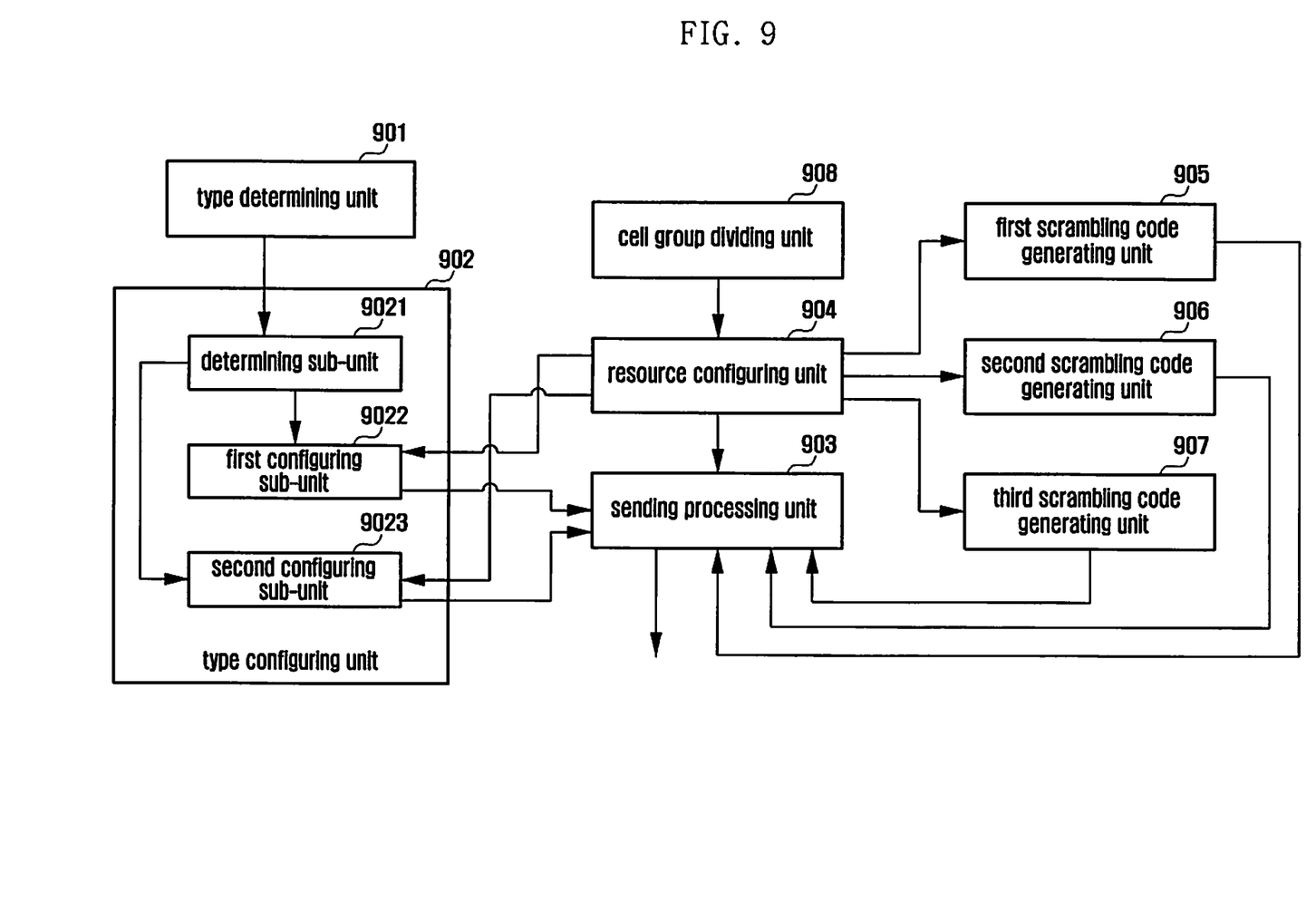
FIG. 9 is a schematic diagram illustrating a structure of an apparatus in accordance with an embodiment of the present invention.

The above are descriptions of the method provided by the present invention, and an apparatus provided by the present invention are described in the following. FIG. 9 is a schematic diagram illustrating a structure of an apparatus in accordance with an embodiment of the present invention. The apparatus is usually configured at a base station, as shown in FIG. 9, the apparatus includes: a type determining unit 901, a type configuring unit 902 and a sending processing unit 903.

The type determining unit 901 is adapted to determine whether UEs participating in MU-MIMO at the same PRB belong to the same cell.

The type configuring unit 902 is adapted to configure that the UE adopts a cell-specific scrambling code sequence when a determining result of the type determining unit 901 is yes; configure that the UEs located in the cells belonging to the same cell group adopt a cell group-specific scrambling code sequence when the determining result of the type determining unit 901 is no; an initialization code of the cell-specific scrambling code sequence is determined according to an identity of the cell to which the UE belongs, and an initialization code of the cell group-specific scrambling code sequence is determined according to an identity of the cell group.

The sending processing unit 903 is adapted to send configuration information of the type configuring unit 902 to the UE, and send a DRS to the UE by using the scrambling code sequence configured for the UE.

In addition, the sending processing unit 903 is also adapted to send the identity of the cell group to which the cell in which each UE is located belongs to the UE through broadcast signaling or RRC signaling.

Preferably, the type configuring unit 902 may include a determining sub-unit 9021, a first configuring sub-unit 9022 and a second configuring sub-unit 9023.

The determining sub-unit 9021 is adapted to, when the determining result of the type determining unit 901 is yes, determine whether the number of the UEs participating in the MU-MIMO is larger than the maximum of the DRSs supported by the cell-specific scrambling code sequence, if no, send a first configuration notice to the first configuring sub-unit 9022; if yes, send a second configuration notice to the first configuring sub-unit 9022; when the determining result of the type determining unit 901 is no, determine whether the number of the UEs belonging to the same cell group is larger than the maximum of the DRSs supported by the cell group-specific scrambling code sequence, if no, send a third configuration notice to the second configuring sub-unit 9023; if yes, send a fourth configuration notice to the second configuring sub-unit 9023.

The first configuring sub-unit 9022 is adapted to, when receiving the first configuration notice, configure that the UE participating in the MU-MIMO adopts the cell-specific scrambling code sequence; when receiving the second configuration notice, configure that, in the UEs participating in the MU-MIMO, a part of the UEs, the number of which is not more than the maximum of the DRSs supported by the cell-specific scrambling code sequence, adopt a cell-specific scrambling code sequence, and configure that the other UEs adopt a cell group-specific scrambling code sequence.

The second configuring sub-unit 9023 is adapted to when receiving the third configuration notice, configure that the UEs located in the cells belonging to the same cell group adopt the cell group-specific scrambling code sequence; when receiving the fourth configuration notice, configure, in the UEs located in the cells belonging to the same cell group, that a part of the UEs, the number of which is not more than the maximum of the DRSs supported by the cell group-specific scrambling code sequence adopt the cell group-specific scrambling code sequence, and configure that the other UEs adopt the cell-specific scrambling code sequence.

Further, the base station may include a resource configuring unit 904, adapted to divided the DRS REs at the PRB into more than one group; configure that each DRS RE group supports the cell-specific scrambling code sequence and the cell group-specific scrambling code sequence at the same time; or configure that each DRS RE group supports one of the cell-specific scrambling code sequence and the cell group-specific scrambling code sequence; or configure that one part of the DRS RE groups supports one of the cell-specific scrambling code sequence and the cell group-specific scrambling code sequence, and the other part of the DRS RE groups supports the cell-specific scrambling code sequence and the cell group-specific scrambling code sequence at the same time.

The type configuring unit 902 is adapted to dispatch the UE adopting the cell-specific scrambling code sequence to the DRS RE supporting the cell-specific scrambling code sequence, and dispatch the UE adopting the cell group-specific scrambling code sequence to the DRS RE supporting the cell group-specific scrambling code sequence.

Accordingly, the base station may also include a first scrambling code generating unit 905, a second scrambling code generating unit 906 or a third scrambling code generating unit 907.

The first scrambling code generating unit 905 is adapted to, when the resource configuring unit 904 configures that each DRS RE group supports the cell-specific scrambling code sequence and the cell group-specific scrambling code sequence at the same time, generate an initialization code of the cell group-specific scrambling code sequence according to the identity of the cell and the number of the time slot in which the PRB is located, or according to the identity of the cell, the number of the time slot in which the PRB is located and an index of the DRS RE group; generate an initialization code of the cell group-specific scrambling code sequence may according to the identity of the cell group and the number of the time slot in which the PRB is located, or according to the identity of the cell group, the number of the time slot in which the PRB is located and an index of the DRS RE group.

The second scrambling code generating unit 906 is adapted to, when the resource configuring unit 904 configures that each DRS RE group supports one of the cell-specific scrambling code sequence and the cell group-specific scrambling code sequence, generate an initialization code of the cell-specific scrambling code sequence according to the identity of the cell, the number of the time slot in which the PRB is located, and a sequence number $n_{SCID}$; generate an initialization code of the cell group-specific scrambling code sequence according to the identity of the cell group and the number of the time slot in which the PRB is located and the sequence number $n_{SCID}$, the sequence number $n_{SCID}$ is a parameter configured by the base station.

The third scrambling code generating unit 907 is adapted to, when the resource configuring unit 904 configures that a part of the DRS RE groups supports one of the cell-specific scrambling code sequence and the cell group-specific scrambling code sequence, and the other part of the DRS RE groups supports the cell-specific scrambling code sequence and the cell group-specific scrambling code sequence at the same time, generate an initialization code of the cell-specific scrambling code sequence according to the identity of the cell and the number of the time slot in which the PRB is located, or according to the identity of the cell, the number of the time slot in which the PRB is located and a sequence number $n_{SCID}$; generate an initialization code of the cell group-specific scrambling code sequence according to the identity of the cell group and the number of the time slot in which the PRB is located.

The base station can generate the cell-specific scrambling code sequence or the cell group-specific scrambling code sequence by using the above initialization codes, and then generate the DRS according to an orthogonal extended code sequence; the sending processing unit 903 sends the DRS to the UE. The solution of generating the scrambling code sequence by using the initialization code and the solution of generating the DRS belong to the prior art, which is not described herein.

The sending processing unit 903 is further adapted to send information of the DRS RE group distributed to each UE to each UE; specifically, if the cell-specific scrambling code sequence and the cell group-specific scrambling code sequence are both configured for the DRS RE group distributed to the UE by the resource configuring unit 904, the type of the scrambling code sequence adopted by the UE is carried by extended bits in a PDCCH; if one of the cell-specific scrambling code sequence and the cell group-specific scrambling code sequence is configured for the DRS RE group distributed to the UE by the resource configuring unit 904, a parameter of the scrambling code sequence adopted by the UE are carried by extended bits in the PDCCH.

In order to better restrain the DRS interferences, the apparatus may also include a cell group dividing unit 908 adapted to divide one cell into only one cell group, or divide one cell into multiple cell groups.

The resource configuring unit 904 is adapted to, when the cell group dividing unit 908 divides one cell into multiple cell groups, configure that the DRS RE group supporting the cell group-specific scrambling code sequence fixedly corresponds to one cell group; or configure that each cell group-specific scrambling code sequence on each DRS RE group fixedly corresponds to one cell group; or configure that the cell group to which the cell belongs changes among multiple cell groups according to a preset period.

It is can be seen from the above description, in the present invention, for the UE adopting the single-cell MU-MIMO, the base station configures that the UE adopt the cell-specific scrambling code sequence, and the initialization code of the cell-specific scrambling code sequence is determined according to the identity of the cell. For the UE using the multiple-cell MU-MIMO, the base station configures that the UE adopted the cell group-specific scrambling code sequence, and the initialization code of the cell group-specific scrambling code sequence is determined according to the identity of the cell group, so that the UE can obtain the scrambling code sequences of other cells which belong to the same cell group, thereby effectively restraining the DRS interferences and improving the precision of the channel estimation.

The foregoing is only the preferred embodiments of the present invention and is not intended to limit the scope of the present invention. Any modification, equivalent substitution, or improvement made without departing from the spirit and principle of the present invention should be covered by the scope set forth in the appended claims.

The invention claimed is:

1. A method for transmitting a dedicated reference signal (DRS), comprising:
determining, by a base station, whether user equipments (UEs) participating in multiple users-multiple input multiple output (MU-MIMO) at the same physical resource block (PRB) belong to the same cell, if yes, configuring that the UEs adopt a cell-specific scrambling code sequence; otherwise, configuring that the UEs located in the cells belonging to the same cell group adopt a cell group-specific scrambling code sequence;
sending, by the base station, configuration information to each of the UEs, and sending a DRS to each of the UEs by using the scrambling code sequence configured for each of the UEs;
wherein an initialization code of the cell-specific scrambling code sequence is determined according to an identity of the cell in which each of the UEs are located; an initialization code of the cell group-specific scrambling code sequence is determined according to an identity of the cell group.

2. The method of claim 1, wherein the identity of the cell group to which the cell in which each of the UEs are located belongs is sent by the base station to each of the UEs through broadcast signaling or radio resource control (RRC) signaling.

3. The method of claim 1, before configuring that the UEs adopt cell-specific scrambling code sequence, further comprising:
determining, by the base station, whether the number of the UEs participating in the MU-MIMO is larger than the maximum of the DRSs supported by the cell-specific scrambling code sequence, if no, keeping performing the step of configuring that the UEs adopt cell-specific scrambling code sequence; if yes, configuring, in the UEs, that a part of the UEs, the number of which is not more than the maximum of the DRSs supported by the cell-specific scrambling code sequences, adopt the cell-specific scrambling code sequence, and configuring that the other part of the UEs adopt the cell group-specific scrambling code sequence, and terminating the flow;
before configuring that the UEs located in the cells belonging to the same cell group adopt cell group-specific scrambling code sequence, further comprising: determining, by the base station, whether the number of the UEs belonging to the same cell group is larger than the maximum of the DRSs supported by the cell group-specific scrambling code sequence; if yes, keeping performing the step of configuring that the UEs located in the cells belonging to the same cell group adopt cell group-specific scrambling code sequence; if yes, configuring, in the UEs located in the cells belonging to the same cell group, that a part of the UEs, the number of which is not more than the maximum of the DRSs supported by the cell group-specific scrambling code sequence, adopt the cell group-specific scrambling code sequence, and configuring that the other part of the UEs adopt cell-specific scrambling code sequence, and terminating the flow.

4. The method of claim 1, wherein DRS resource elements (REs) at the PRB are divided into more than one group; and the method comprise:
configuring, by the base station, that each DRS RE group supports the cell-specific scrambling code sequence and the cell group-specific scrambling code sequence at the same time; or configuring, by the base station, that each DRS RE group supports one of the cell-specific scrambling code sequence and the cell group-specific scrambling code sequence; or configuring, by the base station, that one part of the DRS RE groups supports one of the cell-specific scrambling code sequence and the cell group-specific scrambling code sequence, and the other part of the DRS RE groups supports the cell-specific scrambling code sequence and the cell group-specific scrambling code sequence at the same time.

5. The method of claim 4, wherein when the base station configures that each DRS RE group supports the cell-specific scrambling code sequence and the cell group-specific scrambling code sequence at the same time, an initialization code of the cell-specific scrambling code sequence is generated according to the identity of the cell and a number of a time slot in which the PRB is located, or according to the identity of the cell, a number of a time slot in which the PRB is located and an index of the DRS RE group; an initialization code of the cell group-specific scrambling code sequence is generated according to the identity of the cell group and a number of a time slot in which the PRB is located, or according to the identity of the cell, a number of a time slot in which the PRB is located and an index of the DRS RE group;
  when base station configures that each DRS RE group supports one of the cell-specific scrambling code sequence and the cell group-specific scrambling code sequence, an initialization code of the cell-specific scrambling code sequence is generated according to the identity of the cell and a number of a time slot in which the PRB is located, and a sequence number $n_{SCID}$; an initialization code of the cell group-specific scrambling code sequence is generated according to the identity of the cell group, a number of a time slot in which the PRB is located and a sequence number $n_{SCID}$, the sequence number $n_{SCID}$ is a parameter configured by the base station;
  when the base station configures that a part of the DRS RE groups supports one of the cell-specific scrambling code sequence and the cell group-specific scrambling code sequence, and the other part of the DRS RE groups supports the cell-specific scrambling code sequence and the cell group-specific scrambling code sequence at the same time, an initialization code of the cell-specific scrambling code sequence is generated according to the identity of the cell and a number of a time slot in which the PRB is located, or according to the identity of the cell, a number of a time slot in which the PRB is located and a sequence number $n_{SCID}$; an initialization code of the cell group-specific scrambling code sequence is generated according to the identity of the cell group and a number of a time slot in which the PRB is located.

6. The method of claim 4, wherein the configuration information comprises: the type of the scrambling code sequence adopted for the UEs or a parameter of the scrambling code sequence adopted for the UEs, the method further comprising:
  sending, by the base station, information of the DRS RE group distributed to each UE to each UE.

7. The method of claim 6, wherein the base station carries the information of the DRS RE group distributed to each UE by using DRS port indication information in a physical downlink control channel (PDCCH);
  if the cell-specific scrambling code sequence and the cell group-specific scrambling code sequence are both configured for the DRS RE group distributed to the UEs, the base station carries the type of the scrambling code sequence adopted for the UEs by using extended bits in the PDCCH;
  if one of the cell-specific scrambling code sequence and the cell group-specific scrambling code sequence is configured for the DRS RE group distributed to the UEs, the base station carries the parameter of the scrambling code sequence adopted for the UEs by using extended bits in the PDCCH.

8. The method of claim 4, wherein one cell belongs to only one cell group or belongs to multiple cell groups; the method further comprises:
  when one cell belongs to multiple cell groups, configuring that the DRS RE group supporting the cell group-specific scrambling code sequence fixedly corresponds to one cell group; or configure that each cell group-specific scrambling code sequence on each DRS RE group fixedly corresponds to one cell group; or configure that the cell group to which the cell belongs changes among multiple cell groups according to a preset period.

9. An apparatus for transmitting a dedicated reference signal (DRS), comprising;
  a memory; and
  a processor comprising a type determining unit, a type configuring unit and a sending processing unit;
  wherein:
    the type determining unit is adapted to determine whether UEs participating in MU-MIMO at the same PRB belong to the same cell;
    the type configuring unit is adapted to configure that the UEs adopt a cell-specific scrambling code sequence when a determining result of the type determining unit is yes; configure that the UEs located in the cells belonging to the same cell group adopt a cell group-specific scrambling code sequence when the determining result of the type determining unit is no;
    the sending processing unit is adapted to send configuration information of the type configuring unit to each of the UEs, and send a DRS to each of the UEs by using the scrambling code sequence configured for each of the UEs; and
    an initialization code of the cell-specific scrambling code sequence is determined according to an identity of the cell in which each of the UEs are located; an initialization code of the cell group-specific scrambling code sequence is determined according to an identity of the cell group.

10. The apparatus of claim 9, wherein the sending processing unit is further adapted to send the identity of the cell group to which the cell in which each of the UEs are located belongs to each UE through broadcast signaling or RRC signaling.

11. The apparatus of claim 9, wherein the type configuring unit comprises a determining sub-unit, a first configuring sub-unit and a second configuring sub-unit;
  the determining sub-unit is adapted to, when the determining result of the type determining unit is yes, determine whether the number of the UEs participating in the MU-MIMO is larger than the maximum of the DRSs supported by the cell-specific scrambling code sequence, if no, send a first configuration notice to the first configuring sub-unit; if yes, send a second configuration notice to the first configuring sub-unit; when the determining result of the type determining unit is no, determine whether the number of the UEs belonging to the same cell group is larger than the maximum of the DRSs supported by the cell group-specific scrambling code sequence, if no, send a third configuration notice to the second configuring sub-unit; if yes, send a fourth configuration notice to the second configuring sub-unit;
  the first configuring sub-unit is adapted to, when receiving the first configuration notice, configure that the UEs participating in the MU-MIMO adopt the cell-specific scrambling code sequence; when receiving the second configuration notice, configure that in the UEs participating in the MU-MIMO, a part of the UEs, the number of which is not more than the maximum of the DRSs supported by the cell-specific scrambling code sequence adopt the cell-specific scrambling code sequence, and configure that the other part of the UEs adopt the cell group-specific scrambling code sequence;
  the second configuring sub-unit is adapted to when receiving the third configuration notice, configure that the UEs located in the cells belonging to the same cell group adopt the cell group-specific scrambling code sequence; when receiving the fourth configuration notice, configure in the UEs located in the cells belonging to the same cell group, that a part of the UEs, the number of which is not more than the maximum of the DRSs supported by the cell group-specific scrambling code sequences adopt the cell group-specific scrambling code sequences, and configure that the other part of the UEs adopt the cell-specific scrambling code sequence.

12. The apparatus of claim 9, further comprising: a resource configuring unit, adapted to divide the DRS REs at the PRB into more than one group; configure that each DRS RE group supports the cell-specific scrambling code sequence and the cell group-specific scrambling code sequence at the same time; or configure that each DRS RE group supports one of the cell-specific scrambling code sequence and the cell group-specific scrambling code sequence; or configure that one part of the DRS RE groups supports one of the cell-specific scrambling code sequence and the cell group-specific scrambling code sequence, and the other part of the DRS RE groups supports the cell-specific scrambling code sequence and the cell group-specific scrambling code sequence at the same time; wherein the type configuring unit is adapted to dispatch the UEs adopting the cell-specific scrambling code sequence to the DRS RE supporting the cell-specific scrambling code sequence, and dispatch the UE adopting the cell group-specific scrambling code sequence to the DRS RE supporting the cell group-specific scrambling code sequence.

13. The apparatus of claim 12, further comprising: a first scrambling code generating unit, a second scrambling code generating unit or a third scrambling code generating unit; wherein the first scrambling code generating unit is adapted to, when the resource configuring unit configures that each DRS RE group supports the cell-specific scrambling code sequence and the cell group-specific scrambling code sequence at the same time, generate an initialization code of the cell-specific scrambling code sequence according to the identity of the cell and a number of a time slot in which the PRB is located, or according to the identity of the cell, a number of a time slot in which the PRB is located and an index of the DRS RE group; generate an initialization code of the cell group-specific scrambling code sequence according to the identity of the cell group and a number of a time slot in which the PRB is located, or according to the identity of the cell group, a number of a time slot in which the PRB is located and an index of the DRS RE group;

the second scrambling code generating unit is adapted to, when the resource configuring unit configures that each DRS RE group supports one of the cell-specific scrambling code sequence and the cell group-specific scrambling code sequence, generate an initialization code of the cell-specific scrambling code sequence according to the identity of the cell, a number of a time slot in which the PRB is located, and a sequence number $n_{SCID}$; generate an initialization code of the cell group-specific scrambling code sequence according to the identity of the cell group, a number of a time slot in which the PRB is located and a sequence number $n_{SCID}$, the sequence number $n_{SCID}$ is a parameter configured by the base station;

the third scrambling code generating unit is adapted to, when the resource configuring unit configures that a part of the DRS RE groups supports one of the cell-specific scrambling code sequence and the cell group-specific scrambling code sequence, and the other part of the DRS RE groups supports the cell-specific scrambling code sequence and the cell group-specific scrambling code sequence at the same time, generate an initialization code of the cell-specific scrambling code sequence according to the identity of the cell and a number of a time slot in which the PRB is located, or according to the identity of the cell, a number of a time slot in which the PRB is located and a sequence number $n_{SCID}$; generate an initialization code of the cell group-specific scrambling code sequence according to the identity of the cell group and a number of a time slot in which the PRB is located.

14. The apparatus of claim 12, wherein the sending processing unit is further adapted to send information of the DRS RE group distributed to each UE to each UE; if the cell-specific scrambling code sequence and the cell group-specific scrambling code sequence are both configured for the DRS RE group distributed to the UEs by the resource configuring unit, the type of the scrambling code sequence adopted by the UEs are carried by extended bits in a PDCCH; if one of the cell-specific scrambling code sequence and the cell group-specific scrambling code sequence is configured for the DRS RE group distributed to the UE by the resource configuring unit, a parameter of the scrambling code sequence adopted by the UE are carried by extended bits in a PDCCH.

15. The apparatus of claim 12, further comprising: a cell group dividing unit, adapted to divide one cell into only one cell group, or divide one cell into multiple cell groups; wherein the resource configuring unit is adapted to, when the cell group dividing unit divides one cell into multiple cell groups, configure that the DRS RE group supporting the cell group-specific scrambling code sequence fixedly corresponds to one cell group; or configure that each cell group-specific scrambling code sequence on each DRS RE group fixedly corresponds to one cell group; or configure that the cell group to which the cell belongs changes among multiple cell groups according to a preset period.

* * * * *